(12) United States Patent
Kitamura (10) Patent No.: US 6,453,262 B1
(45) Date of Patent: Sep. 17, 2002

(54) METHOD AND APPARATUS FOR SELECTING A PROCESSING MODE FOR A BICYCLE COMPUTER

(75) Inventor: Satoshi Kitamura, Kitakatsuragigun (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/471,668

(22) Filed: Dec. 24, 1999

(51) Int. Cl.$^7$ .......................... G06M 3/06; G01C 22/00
(52) U.S. Cl. .......................... 702/145; 474/70; 324/160
(58) Field of Search ................................. 702/145, 146, 702/148; 474/70, 80, 81, 103, 110; 701/51, 57, 59; 324/176, 160, 166

(56) References Cited

U.S. PATENT DOCUMENTS 4,065,983 A  1/1978  Mimura .......................... 74/625
5,059,158 A  10/1991  Bellio et al. .......................... 474/70

FOREIGN PATENT DOCUMENTS

EP  849158 A1  6/1998

*Primary Examiner*—Kamini Shah
(74) *Attorney, Agent, or Firm*—James A. Deland (57) ABSTRACT

A mechanism for selecting a processing mode for a bicycle computer includes a mounting member adapted to be mounted on a first bicycle component; a first signal sensor retained to the mounting member; a second signal sensor retained to the mounting member; and a first signal provider for providing a first signal and arranged to be disposed in a predetermined plurality of positions relative to the first signal sensor and the second signal sensor. The algorithm used to control the desired component may be selected based on whether the first signal is sensed by the first signal sensor and/or the second signal sensor.

60 Claims, 5 Drawing Sheets

METHOD AND APPARATUS FOR SELECTING A PROCESSING MODE FOR A BICYCLE COMPUTER

BACKGROUND OF THE INVENTION

The present invention is directed to computer control devices for bicycle devices and, more particularly, to a method and apparatus for selecting a processing mode for a computer controlled bicycle transmission.

Many computer controlled bicycle transmissions have been designed over the years. The goal of such systems usually is to shift the bicycle transmission so that the rider exerts a relatively constant pedaling effort or maintains a substantially constant pedaling rate. Known systems accomplish this in a number of ways. Some systems use the speed of the bicycle to determine when to shift the bicycle transmission. Other systems use the pedaling rate to determine when to shift the bicycle transmission. Yet other systems use a combination of bicycle speed and pedaling rate. Even more sophisticated systems use tension or compression of drive train components, either alone or in combination with bicycle pedaling speed and/or pedaling rate, to determine how much effort is being used to pedal the bicycle and to shift the transmission accordingly. Some systems even use external variables such as the rider's heart rate to determine when to shift the bicycle transmission. Regardless of the system used, it is sometimes desirable to process the input data (bicycle speed, pedaling rate, tension or compression of drive train components, heart rate, etc.) differently under different circumstances. For example, it may be desirable to process the input data one way when riding on a level road and in a different way when riding in mountainous terrain.

One way to switch algorithms used to process the input data is to provide one or more switches on a handlebar mounted shift control device to select the desired algorithm. However, such switches ordinarily must be pressed alone or in combination in a particular sequence that often is not intuitive at all. Also, such switches add to the cost and complexity of the shift control device, are subject to contamination and malfunctioning, and must be constantly powered, thus reducing battery life.

SUMMARY OF THE INVENTION

The present invention is directed to a method and apparatus for selecting a processing mode for a bicycle computer which does not require separate switches on the shift control device or complicated procedures to select the desired processing mode. In one embodiment of the present invention, a mechanism for selecting a processing mode for a bicycle computer includes a mounting member adapted to be mounted on a first bicycle component; a first signal sensor retained to the mounting member; a second signal sensor retained to the mounting member; and a first signal provider for providing a first signal and arranged to be disposed in a predetermined plurality of positions relative to the first signal sensor and the second signal sensor. The algorithm used to control the desired component may be selected based on whether the first signal is sensed by the first signal sensor and/or the second signal sensor.

More specifically, a processor may be operatively coupled to the first signal sensor and to the second signal sensor for performing a first sequence of calculations when the first signal sensor senses the first signal and for performing a second sequence of calculations different from the first sequence of calculations when the second signal sensor senses the first signal. In a more specific embodiment, the processor performs a third sequence of calculations when both the first signal sensor and the second signal sensor sense the first signal, wherein the third sequence of calculations may be different from the first sequence of calculations and the second sequence of calculations.

Typically, the signal provider may be temporarily or permanently placed in close proximity to the first signal sensor so that the processor performs the first sequence of calculations, and then the signal provider may be temporarily or permanently placed in close proximity to the second signal sensor so that the processor performs the second sequence of calculations. If the first signal sensor and the second signal sensor are placed close to each other, then the first signal provider may be somewhat centered over the first signal sensor and the second signal sensor so that both the first and second signal sensors are activated and thereby cause the processor to perform the third sequence of calculations. If desired, the first signal provider may be large enough to provide a signal to both the first signal sensor and the second signal sensor. In this case a signal filter may be provided for selectively communicating the first signal to the first signal sensor and/or the second signal sensor.

As applied to a bicycle, a mechanism for selecting a processing mode for a bicycle computer includes a first bicycle component and a second bicycle component, wherein at least one of the first bicycle component and the second bicycle component moves relative to the other one of the first bicycle component and the second bicycle component. A signal provider is retained to the first bicycle component, wherein the signal provider provides a first signal. A first signal sensor is retained to the second bicycle component, and a second signal sensor is retained to the second bicycle component. A processor is operatively coupled to the first signal sensor and to the second signal sensor for performing a first sequence of calculations when the first signal sensor senses the first signal and for performing a second sequence of calculations different from the first sequence of calculations when the second signal sensor senses the first signal. In a more specific embodiment, the at least one of the first bicycle component and the second bicycle component rotates relative to the other one of the first bicycle component and the second bicycle component around a rotational axis. If desired, the first bicycle component may be one of a bicycle frame member and a bicycle wheel, and the second bicycle component may be the other one of the bicycle frame member and the bicycle wheel. Alternatively, the first bicycle component may be one of a bicycle frame member and a pedal crank, and the second bicycle component may be the other one of the bicycle frame member and the pedal crank.

DETAILED DESCRIPTION OF THE EMBODIMENTS

Figure 1:
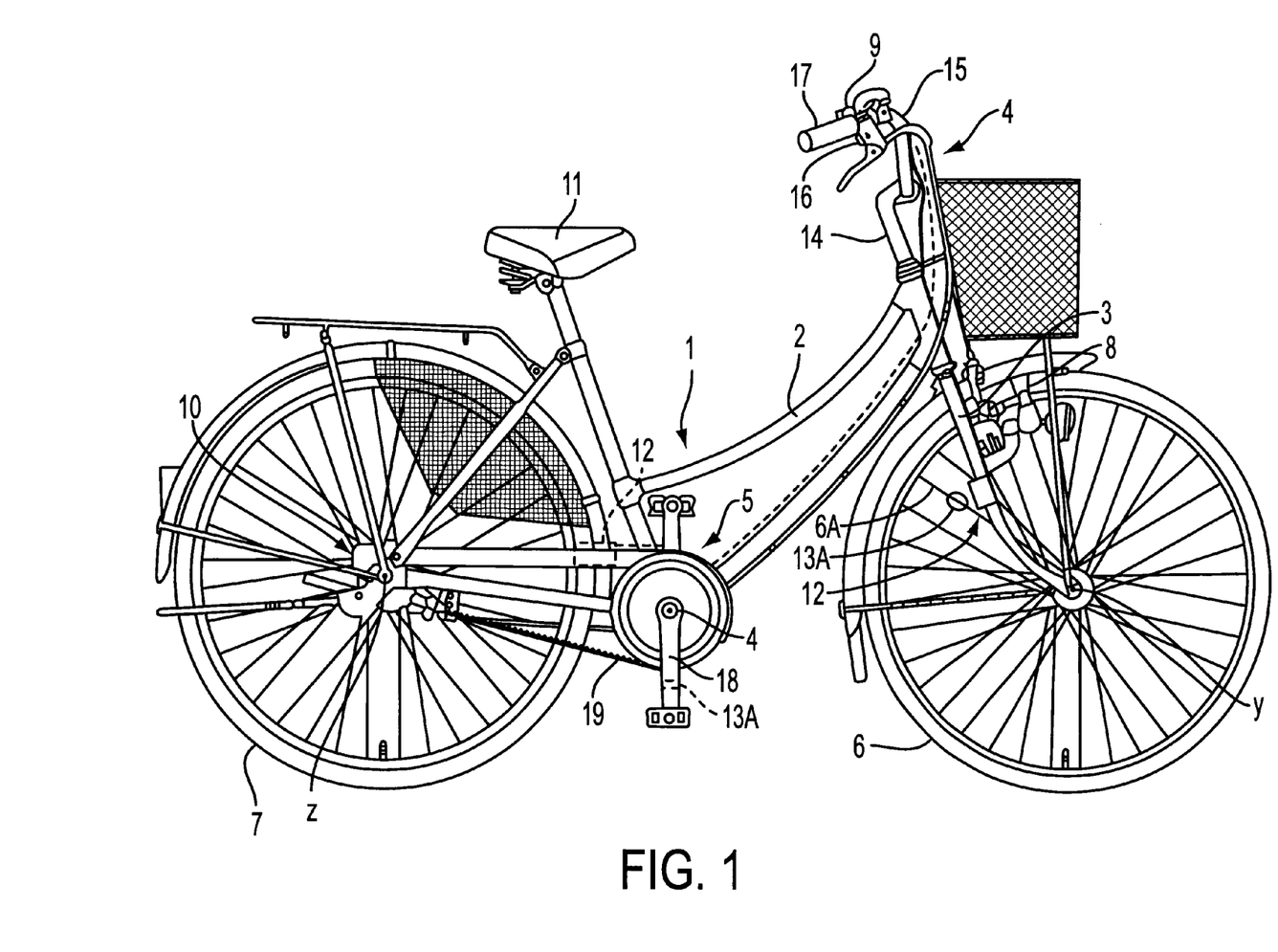
FIG. 1 is a side view of a bicycle that includes a particular embodiment of a bicycle computer and an apparatus according to the present invention for selecting a processing mode for the bicycle computer.

FIG. 1 is a side view of a bicycle that includes a particular embodiment of a bicycle computer and an apparatus according to the present invention for selecting a processing mode for the bicycle computer. The bicycle includes a frame 1 with a double-loop type of frame unit 2 and a front fork 3; a handle component 4; a drive component 5 for rotation around an axis X; a front wheel 6 for rotation around an axis Y; a rear wheel 7 in which a four-speed internal shifting hub 10 is mounted for rotation around an axis Z; front and rear brake devices 8 (only the front brake device is shown in figure); and a shift control element 9 for conveniently operating the internal shifting hub 10, and a saddle 11. The handle component 4 has a handle stem 14 that is fixed to the upper portion of the front fork 3 and a handlebar 15 that is fixed to the handle stem 14. Brake levers 16 and grips 17 which constitute part of the brake devices 8 are mounted at either end of the handlebar 15. A shift control element 9 is mounted on the right-side brake lever 16. The drive component 5 has a pedal crank 18 that is provided to the lower portion (bottom bracket portion) of the frame body 2, a chain 19 that is wrapped around the pedal crank 18, and the internal gear hub 10.

A sensor unit 12 constructed as described below is mounted on the front fork 3. This sensor unit 12 outputs signals by detecting a magnet 13A mounted on a spoke 6A of the front wheel 6.

Figure 2:
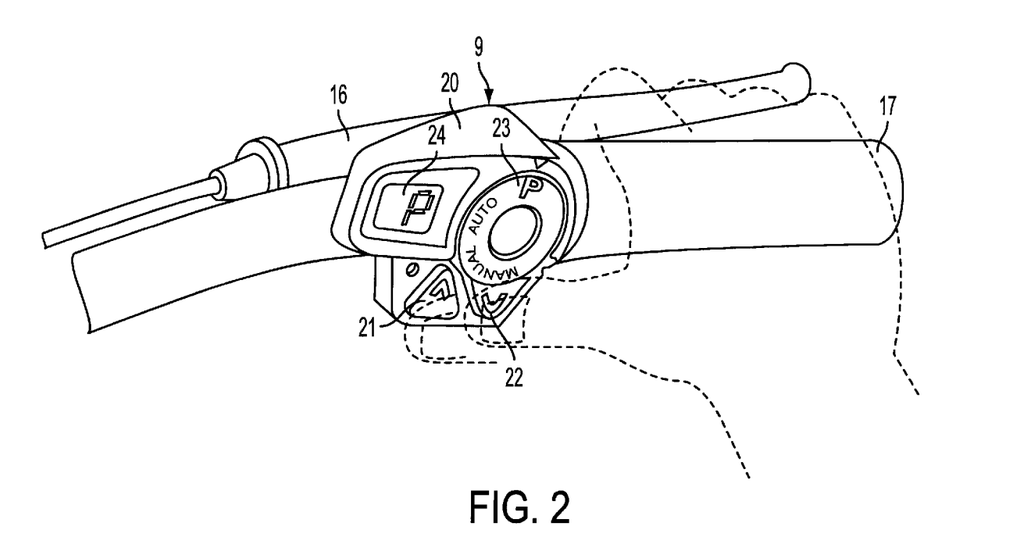
FIG. 2 is an oblique view of a particular embodiment of a shift control device according to the present invention.

As shown in FIG. 2, the shift control element 9 has a control panel 20 formed integrally with the right-side (front-wheel) brake lever 16, two control buttons 21 and 22 disposed next to each other to the left and right on the lower portion of the control panel 20, a control dial 23 disposed above the control buttons 21 and 22, and a liquid-crystal display component 24 disposed to the left of the control dial 23. The current riding speed is displayed on the liquid-crystal display component 24, as is the speed step selected at the time of the shift.

The control buttons 21 and 22 are triangular push buttons. The control button 21 on the left side is used to manually perform shifts to a higher speed step, while the control button 22 on the right side is used to manually perform shifts to a lower speed step. The control dial 23 is used to switch among two shifting modes and a parking mode (P), and it has three stationary positions: P, A, and M. Here, the shift mode comprises an automatic shift (A) mode and a manual shift (M) mode. The automatic shift mode is for automatically shifting the internal shifting hub 10 by means of signals from the sensor unit 12, and the manual shift mode is for shifting the internal shifting hub 10 through the operation of the control buttons 21 and 22. The parking mode is for locking the internal shifting hub 10 and controlling the rotation of the rear wheel 7 in a variety of known manners.

Figure 3:
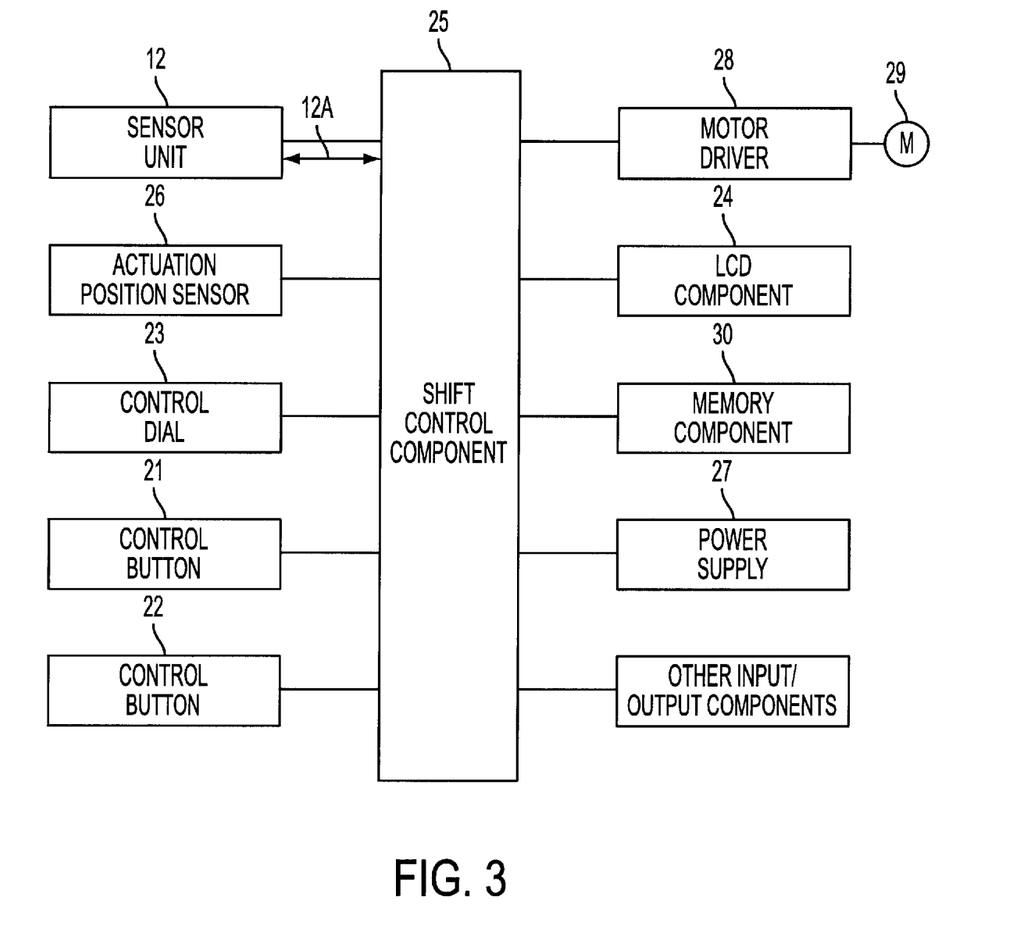
FIG. 3 is a block diagram of the bicycle computer according to the present invention which is capable of selecting a processing mode for the bicycle computer.

A shift control component 25 (FIG. 3) that is used to control shifting is housed inside the control panel 20. The shift control component 25 comprises a microcomputer consisting of a CPU, a RAM, a ROM, and an I/O interface. As shown in FIG. 3, the shift control component 25 is connected to the sensor unit 12 through a communication path 12A which may be a wired or wireless communication path (a wired communication path is shown in this embodiment), an actuation position sensor 26 composed of a potentiometer (for example, a potentiometer that senses the actuation position of the internal shifting hub 10), the control dial 23, and the control buttons 21 and 22. The shift control component 25 is also connected to a power supply 27 (consisting of a battery), a motor driver 28, the liquid-crystal display component 24, a memory component 30, and other input/output components. A shift motor 29 is connected to the motor driver 28. Various types of data, such as speed tables and the tire diameter, are stored in the memory component 30. A speed table is a table of the upper and lower speeds for each gear. Shift control component 25 shifts the transmission to a higher gear when the bicycle speed exceeds the upper speed for a current gear, and shift control component 25 shifts to a lower gear when the bicycle speed falls below the lower speed for a current gear. Also stored in memory 30 may be different processing sequences or algorithms for use with the stored data. The use of a particular algorithm with a particular speed table is an example of a processing mode, as it performs a sequence of calculations with the data from that speed table. The use of a particular algorithm with a different speed table is an example of another processing mode, as it performs a different sequence of calculations because it uses data from a different speed table. The use of different algorithms with the same speed tables, the use of different algorithms with different speed tables, or the use of different algorithms with different data constants or other data are considered additional processing modes, for they perform a different sequence of calculations either in the mathematical operations performed or in the use of different variables or constants in the same mathematical operations. The shift control component 25 controls the motor 29 according to the various modes, and it also controls the display of the liquid-crystal display component 24.

Figure 4:
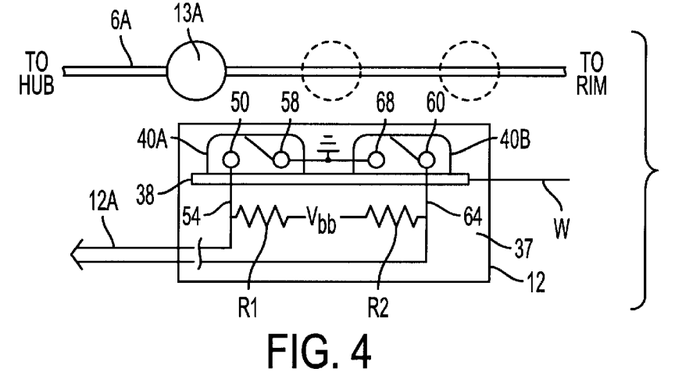
FIG. 4 is a schematic diagram of a particular embodiment of an apparatus according to the present invention for selecting a processing mode for the bicycle computer.

FIG. 4 is a schematic diagram of a particular embodiment of sensor unit 12 and magnet 13A which in this embodiment forms an apparatus according to the present invention for selecting a processing mode for shift control component 25. In this embodiment, sensor unit 12 includes a mounting member in the form of a housing 37 containing a printed circuit board 38 which may or may not include various signal conditioning devices, transmitters, receivers, I/O processors, buffers, one or more distributed processors for performing one or more of the functions performed by shift control component 25, and/or other components. A first sensor 40A, which in this embodiment is a reed switch or other magnetic sensor, is directly mounted to printed circuit board 38. Similarly, a second sensor 40B, which in this embodiment also is a reed switch or other magnetic sensor, is directly mounted to printed circuit board 38. Housing 37 and printed circuit board 38 are elongated in the direction of an axis W. As shown in FIG. 4, sensors 40A and 40B are spaced apart in the direction of axis W, and both sensors 40A and 40B face in the same direction toward spoke 6A and away from board 38.

In this embodiment, sensors 40A and 40B are activated by magnetic signals applied to their edges. Thus, sensor 40A alone would be activated with magnet 13A located on spoke 6A in the position shown in FIG. 4. Sensors 40A and 40B both would be activated if magnet 13A were located on spoke 6A in the middle position shown by broken lines, and sensor 40B alone would be activated if magnet 13A were located on spoke 6A in the right side position shown by broken lines.

Sensor 40A has a first terminal 50 connected to a signal line 54 which forms a part of communication path 12A and a second terminal 58 connected to a ground potential (which may be supplied on printed circuit board 38). Similarly, sensor 40B has a first terminal 60 connected to a signal line 64 which forms a part of communication path 12A and a second terminal 68 connected to the ground potential. Signal line 54 is connected to one terminal of a resistance R1, and signal line 64 is connected to one terminal of a resistance R2. The other terminals of resistances R1 and R2 are connected to a voltage potential Vbb. Thus, a signal that alternates between the ground potential and a voltage proportional to resistance R1 will be supplied on line 54 when sensor 40A is activated and deactivated, and a signal that alternates between the ground potential and a voltage proportional to resistance R2 will be supplied on line 64 when sensor 40B is activated and deactivated. In this embodiment, shift control component 25 performs a first sequence of calculations, such as determining at what speed to shift the bicycle transmission in accordance with a first speed table, when sensor 40A is activated. Shift control component 25 performs a second sequence of calculations different from the first sequence of calculations (such as determining at what speed to shift the bicycle transmission in accordance with a second speed table) when sensor 40B is activated, and shift control component 25 performs a third sequence of calculations different from the first sequence of calculations and the second sequence of calculations (such as determining the bicycle speed alone) when both sensors 40A and 40B are activated. Of course, in other embodiments one or more of the sequences of calculations can be the same as one or more of the other sequence of calculations as desired. In addition, the bicycle speed can be calculated in addition to whatever sequence of calculations is being performed when sensor 40A or sensor 40B is activated alone.

Figure 5:
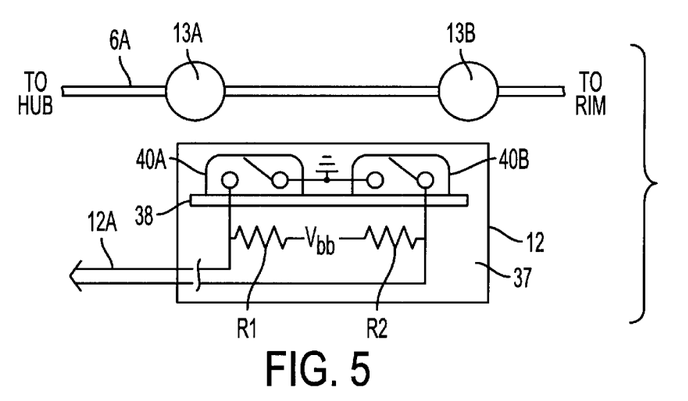
FIG. 5 is a schematic diagram of another embodiment of an apparatus according to the present invention for selecting a processing mode for the bicycle computer.

FIG. 5 is a schematic diagram of another embodiment of an apparatus according to the present invention for selecting a processing mode for the bicycle computer. The sensor unit 12 in this embodiment is the same as in the previous embodiment. However, in this embodiment a second magnet 13B is attached to spoke 6A radially outwardly from magnet 13A. Thus, in the configuration shown in FIG. 5 both sensors 40A and 40B will be activated simultaneously.

Figure 6:
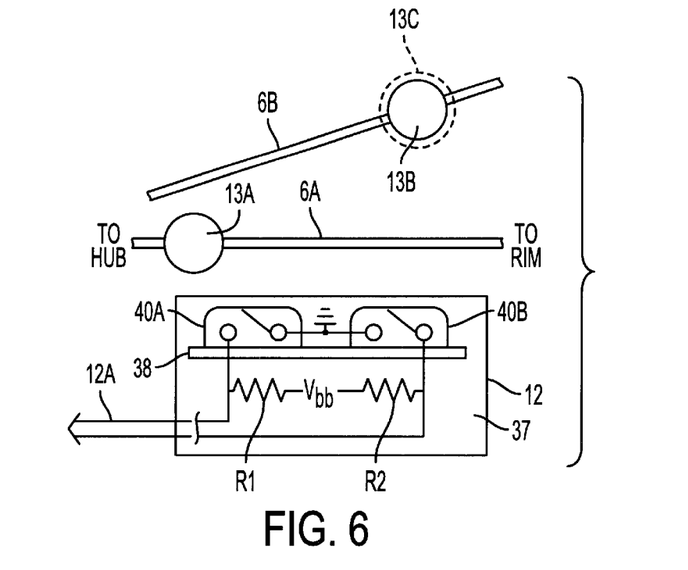
FIG. 6 is a schematic diagram of another embodiment of an apparatus according to the present invention for selecting a processing mode for the bicycle computer.

FIG. 6 is a schematic diagram of another embodiment of an apparatus according to the present invention for selecting a processing mode for the bicycle computer. The sensor unit 12 in this embodiment also is the same as in the previous embodiments. However, in this embodiment a second magnet 13B is attached to a different spoke 6B radially outwardly from magnet 13A. This embodiment has the additional advantage that the direction of rotation of the wheel can be determined based on which sensor 40A or 40B is activated first.

In the embodiments shown in FIGS. 5 and 6 the two magnets 13A and 13B may be the same size or the magnetic signals may have the same strength. Alternatively, magnets 13A and 13B may have different sizes or magnetic signals with different strengths, as shown schematically in broken lines by a larger magnet 13C in FIG. 6. In this case sensors 40A and/or 40B may be adapted to process the different signals accordingly.

Figure 7:
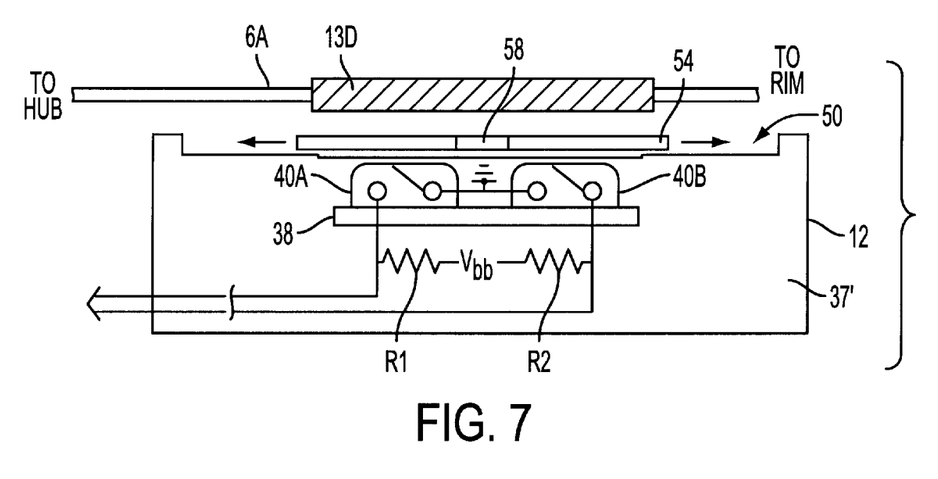
FIG. 7 is a schematic diagram of another embodiment of an apparatus according to the present invention for selecting a processing mode for the bicycle computer.

FIG. 7 is a schematic diagram of another embodiment of an apparatus according to the present invention for selecting a processing mode for the bicycle computer. In this embodiment, an elongated magnet 13D is attached to spoke 6A, wherein the length of magnet 13D is sufficient to provide a magnetic signal to both sensor 40A and sensor 40B. Also, a housing 37' of a sensor unit 12 is provided with a groove 50 for slidably supporting a signal filter 54 such that signal filter 54 is disposed between magnet 13D and sensor unit 12. In this embodiment, signal filter 54 is a metal plate having an opening 58 for allowing the magnetic signal from magnet 13D to pass therethrough. Thus, which sensor 40A and 40B is activated depends on the position of filter 54 and hence opening 58. In the position shown in FIG. 7, both sensor 40A and second 40B will be activated when magnet 13D passes by them.

While the above is a description of various embodiments of the present invention, further modifications may be employed without departing from the spirit and scope of the present invention. For example, the position of the magnets may be varied relative to the sensor unit either by moving the magnets or by moving the sensor unit. While the magnets (13A, 13B, 13C, 13D) were mounted on the wheel 6 and the sensor unit 12 was mounted on the front fork 3, the magnets also could be mounted on the pedal crank 18 and the sensor unit mounted on the frame 1. Also, the magnets (13A, 13B, 13C, 13D) could be mounted on the fork 3 and the sensor unit 12 mounted on the wheel 6 (in the case of a wireless system, for example) or the magnets (13A, 13B, 13C, 13D) could be mounted on the frame 1 and the sensor unit 12 could be mounted on the crank 18 as shown by broken lines in FIG. 1. Thus, the size, shape, location or orientation of the various components may be changed as desired.

While magnets that emit a signal were disclosed in the preferred embodiments, any structure that provides a signal may be employed. In this sense providing a signal means both generating a signal and removing or blocking a preexisting signal. For example, a light generator could be mounted on one side of fork 3 and an optical sensor unit could be placed on the other side of fork 3. A member that blocks the transmission of light from the light generator (or even ambient light) to the sensor unit can be considered a signal provider because it provides a "negative" signal to the sensor.

While the apparatus according to the present invention was used to control a bicycle transmission, the apparatus could be used to control any bicycle device or devices that benefit from different processing modes. Also, while the shift control element 9 was capable of being operated in a manual mode, such a mode could be omitted together with buttons 21 and 22 and even dial 23. In that case there will be no moving parts to deteriorate and/or malfunction, with a corresponding reduction in overall cost of the device.

The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. An apparatus for selecting a processing mode for a bicycle computer comprising:
   a mounting member adapted to be mounted on a first bicycle component;
   a first signal sensor retained to the mounting member;
   a second signal sensor retained to the mounting member; and
   a first signal provider arranged to be disposed in a predetermined plurality of positions relative to the first signal sensor and the second signal sensor, wherein the first signal provider does not contact the first signal sensor and the second signal sensor.

2. The apparatus according to claim 1 wherein the first signal provider is adapted to be mounted on a second bicycle component, wherein the first signal provider provides a first signal.

3. The apparatus according to claim 1 wherein the first signal sensor and the second signal sensor are disposed in the mounting member.

4. The apparatus according to claim 1 further comprising a printed circuit board disposed in the mounting member, wherein the first signal sensor and the second signal sensor are disposed directly on the printed circuit board.

5. An apparatus for selecting a processing mode for a bicycle computer comprising:
   a mounting member adapted to be mounted on a first bicycle component;
   a first signal sensor retained to the mounting member;
   a second signal sensor retained to the mounting member;
   a first signal provider arranged to be disposed in a predetermined plurality of positions relative to the first signal sensor and the second signal sensor; and
   wherein the first signal provider comprises a magnetic signal provider, wherein the first signal sensor comprises a first magnetic signal sensor, and wherein the second signal sensor comprises a second magnetic signal sensor.

6. The apparatus according to claim 1 wherein the mounting member is an elongated member with a longitudinal axis, wherein the first signal sensor is spaced apart from the second signal sensor in a direction of the longitudinal axis.

7. The apparatus according to claim 6 wherein the first signal sensor faces in a same direction as the second signal sensor.

8. The apparatus according to claim 7 wherein the first signal provider comprises a magnetic signal provider, wherein the first signal sensor comprises a first magnetic signal sensor, and wherein the second signal sensor comprises a second magnetic signal sensor.

9. The apparatus according to claim 1 further comprising a second signal provider arranged to be disposed in a predetermined plurality of positions relative to the first signal sensor and the second signal sensor.

10. The apparatus according to claim 9 wherein the second signal provider is larger than the first signal provider.

11. The apparatus according to claim 1 wherein the first signal provider provides a first signal, and further comprising a signal filter for selectively allowing the first signal to be sensed by one of the first signal sensor and the second signal sensor.

12. The apparatus according to claim 11 wherein the signal filter comprises a filter member arranged to be disposed between the first signal provider and the first and second signal sensors, wherein the filter member includes an opening for allowing the first signal to be sensed through the filter member.

13. An apparatus for selecting a processing mode for a bicycle computer comprising:
   a mounting member adapted to be mounted on a first bicycle component;
   a first signal sensor retained to the mounting member;
   a second signal sensor retained to the mounting member;
   a first signal provider arranged to be disposed in a predetermined plurality of positions relative to the first signal sensor and the second signal sensor, wherein the first signal provider provides a first signal;
   a processor operatively coupled to the first signal sensor and to the second signal sensor for performing a first sequence of calculations when the first signal sensor senses the first signal and for performing a second sequence of calculations different from the first sequence of calculations when the second signal sensor senses the first signal.

14. The apparatus according to claim 13 wherein the first signal provider is adapted to be mounted on a second bicycle component, wherein the first signal provider provides a first signal.

15. The apparatus according to claim 13 wherein the first signal sensor and the second signal sensor are disposed in the mounting member.

16. The apparatus according to claim 13 further comprising a printed circuit board disposed in the mounting member, wherein the first signal sensor and the second signal sensor are disposed directly on the printed circuit board.

17. The apparatus according to claim 13 wherein the first signal provider comprises a magnetic signal provider, wherein the first signal sensor comprises a first magnetic signal sensor, and wherein the second signal sensor comprises a second magnetic signal sensor.

18. The apparatus according to claim 13 wherein the mounting member is an elongated member with a longitudinal axis, wherein the first signal sensor is spaced apart from the second signal sensor in a direction of the longitudinal axis.

19. The apparatus according to claim 18 wherein the first signal sensor faces in a same direction as the second signal sensor.

20. The apparatus according to claim 19 wherein the first signal provider comprises a magnetic signal provider, wherein the first signal sensor comprises a first magnetic signal sensor, and wherein the second signal sensor comprises a second magnetic signal sensor.

21. The apparatus according to claim 13 further comprising a second signal provider arranged to be disposed in a predetermined plurality of positions relative to the first signal sensor and the second signal sensor.

22. The apparatus according to claim 21 wherein the second signal provider is larger than the first signal provider.

23. The apparatus according to claim 13 further comprising a signal filter for selectively allowing the first signal to be sensed by one of the first signal sensor and the second signal sensor.

24. The apparatus according to claim 23 wherein the signal filter comprises a filter member arranged to be disposed between the first signal provider and the first and second signal sensors, wherein the filter member includes an opening for allowing the first signal to be sensed through the filter member.

25. The apparatus according to claim 13 wherein the processor performs the first sequence of calculations when only the first signal sensor senses the first signal.

26. The apparatus according to claim 13 wherein the processor performs a third sequence of calculations when both the first signal sensor and the second signal sensor sense the first signal.

27. The apparatus according to claim 26 wherein the third sequence of calculations is different from the first sequence of calculations and the second sequence of calculations.

28. The apparatus according to claim 27 wherein the signal provider comprises a magnetic signal provider, wherein the first signal sensor comprises a first magnetic signal sensor, and wherein the second signal sensor comprises a second magnetic signal sensor.

29. An apparatus for selecting a processing mode for a bicycle computer comprising:
- a first bicycle component;
- a second bicycle component;
  - wherein at least one of the first bicycle component and the second bicycle component moves relative to the other one of the first bicycle component and the second bicycle component;
  - a signal provider retained to the first bicycle component, wherein the signal provider provides a first signal;
  - a first signal sensor retained to the second bicycle component;
  - a second signal sensor retained to the second bicycle component; and
  - a processor operatively coupled to the first signal sensor and to the second signal sensor for performing a first sequence of calculations when the first signal sensor senses the first signal and for performing a second sequence of calculations different from the first sequence of calculations when the second signal sensor senses the first signal.

30. The apparatus according to claim 29 wherein the at least one of the first bicycle component and the second bicycle component rotates relative to the other one of the first bicycle component and the second bicycle component around a rotational axis.

31. The apparatus according to claim 30 wherein the first bicycle component is one of a bicycle frame member and a bicycle wheel, and wherein the second bicycle component is the other one of the bicycle frame member and the bicycle wheel.

32. The apparatus according to claim 31 wherein the signal provider comprises a magnetic signal provider, wherein the first signal sensor comprises a first magnetic signal sensor, and wherein the second signal sensor comprises a second magnetic signal sensor.

33. The apparatus according to claim 30 wherein the first bicycle component is one of a bicycle frame member and a pedal crank, and wherein the second bicycle component is the other one of the bicycle frame member and the pedal crank.

34. The apparatus according to claim 33 wherein the signal provider comprises a magnetic signal provider, wherein the first signal sensor comprises a first magnetic signal sensor, and wherein the second signal sensor comprises a second magnetic signal sensor.

35. The apparatus according to claim 30 wherein the processor performs the first sequence of calculations when only the first signal sensor senses the first signal.

36. The apparatus according to claim 30 wherein the processor performs a third sequence of calculations when both the first signal sensor and the second signal sensor sense the first signal.

37. The apparatus according to claim 36 wherein the third sequence of calculations is different from the first sequence of calculations and the second sequence of calculations.

38. The apparatus according to claim 37 wherein the signal provider comprises a magnetic signal provider, wherein the first signal sensor comprises a first magnetic signal sensor, and wherein the second signal sensor comprises a second magnetic signal sensor.

39. The apparatus according to claim 30 wherein the first signal sensor and the second signal sensor are disposed within a mounting member.

40. The apparatus according to claim 39 further comprising a printed circuit board disposed in the mounting member, wherein the first signal sensor and the second signal sensor are disposed directly on the printed circuit board.

41. The apparatus according to claim 39 wherein the mounting member is an elongated member with a longitudinal axis, wherein the first signal sensor is spaced apart from the second signal sensor in a direction of the longitudinal axis.

42. The apparatus according to claim 41 wherein the first signal sensor faces in a same direction as the second signal sensor.

43. The apparatus according to claim 42 wherein the first signal provider comprises a magnetic signal provider, wherein the first signal sensor comprises a first magnetic signal sensor, and wherein the second signal sensor comprises a second magnetic signal sensor.

44. The apparatus according to claim 30 further comprising a second signal provider arranged to be disposed in a predetermined plurality of positions relative to the first signal sensor and the second signal sensor.

45. The apparatus according to claim 44 wherein the second signal provider is larger than the first signal provider.

46. The apparatus according to claim 30 further comprising signal filter for selectively allowing the first signal to be sensed by one of the first signal sensor and the second signal sensor.

47. The apparatus according to claim 46 wherein the signal filter comprises a filter member arranged to be disposed between the first signal provider and the first and second signal sensors, wherein the filter member includes an opening for allowing the first signal to be sensed through the filter member.

48. A method of operating a bicycle computer comprising the steps of:
- retaining a signal provider to one of a first bicycle component and a second bicycle component, wherein the signal provider provides a first signal;
- retaining a first signal sensor on the other one of the first bicycle component and the second bicycle component;
- retaining a second signal sensor on the other one of the first bicycle component and the second bicycle component;
- moving at least one of the first bicycle component and the second bicycle component relative to the other one of the first bicycle component and the second bicycle component;
- performing a first sequence of calculations with a processor when the first signal sensor senses the first signal; and
- performing a second sequence of calculations different from the first sequence of calculations when the second signal sensor senses the first signal.

49. The method according to claim 48 wherein the step of performing the first sequence of calculations comprises the step of performing the first sequence of calculations when only the first signal sensor senses the first signal.

50. The method according to claim 48 wherein the processor performs a third sequence of calculations when both the first signal sensor and the second signal sensor sense the first signal.

51. The method according to claim 50 wherein the third sequence of calculations is different from the first sequence of calculations and the second sequence of calculations.

52. The method according to claim 51 wherein the first signal comprises a magnetic signal.

53. The method according to claim 48 wherein the step of moving the at least one of the first bicycle component and the second bicycle component comprises the step of rotating the one of the first bicycle component and the second bicycle component relative to the other one of the first bicycle component and the second bicycle component around a rotational axis.

54. The method according to claim 53 wherein the first bicycle component is a bicycle wheel, wherein the second bicycle component is a bicycle frame, and wherein the step of moving the at least one of the first bicycle component and the second bicycle component comprises the step of rotating the bicycle wheel relative to the bicycle frame around a rotational axis.

55. The method according to claim 54 wherein the step of retaining the signal provider on one of the first bicycle component and the second bicycle component comprises the step of retaining the signal provider to a wheel spoke.

56. The method according to claim 55 wherein the first signal comprises a magnetic signal.

57. The method according to claim 53 wherein the first bicycle component is a pedal crank, wherein the second bicycle component is a bicycle frame, and wherein the step of moving the at least one of the first bicycle component and the second bicycle component comprises the step of rotating the pedal crank relative to the bicycle frame around a rotational axis.

58. The method according to claim 57 wherein the step of retaining the signal provider on one of the first bicycle component and the second bicycle component comprises the step of retaining the signal provider to the pedal crank.

59. The method according to claim 58 wherein the first signal comprises a magnetic signal.

60. An apparatus for selecting a processing mode for a bicycle computer comprising:

a first bicycle component;

a second bicycle component;

wherein at least one of the first bicycle component and the second bicycle component continuously rotates relative to the other one of the first bicycle component and the second bicycle component during normal riding motion of the bicycle;

a signal provider retained to the first bicycle component, wherein the signal provider provides a first signal;

a first signal sensor retained to the second bicycle component;

a second signal sensor retained to the second bicycle component; and a processor operatively coupled to the first signal sensor and to the second signal sensor for performing a first sequence of calculations when the first signal sensor senses the first signal and for performing a second sequence of calculations different from the first sequence of calculations when the second signal sensor senses the first signal.

* * * * *